Dec. 10, 1935.  S. B. RALSTON  2,023,548
APPARATUS FOR GRAPHICALLY ASCERTAINING THE STABILITY
AND TRIM OF SHIPS UNDER ASSUMED LOADS
Filed Sept. 22, 1934  2 Sheets-Sheet 1
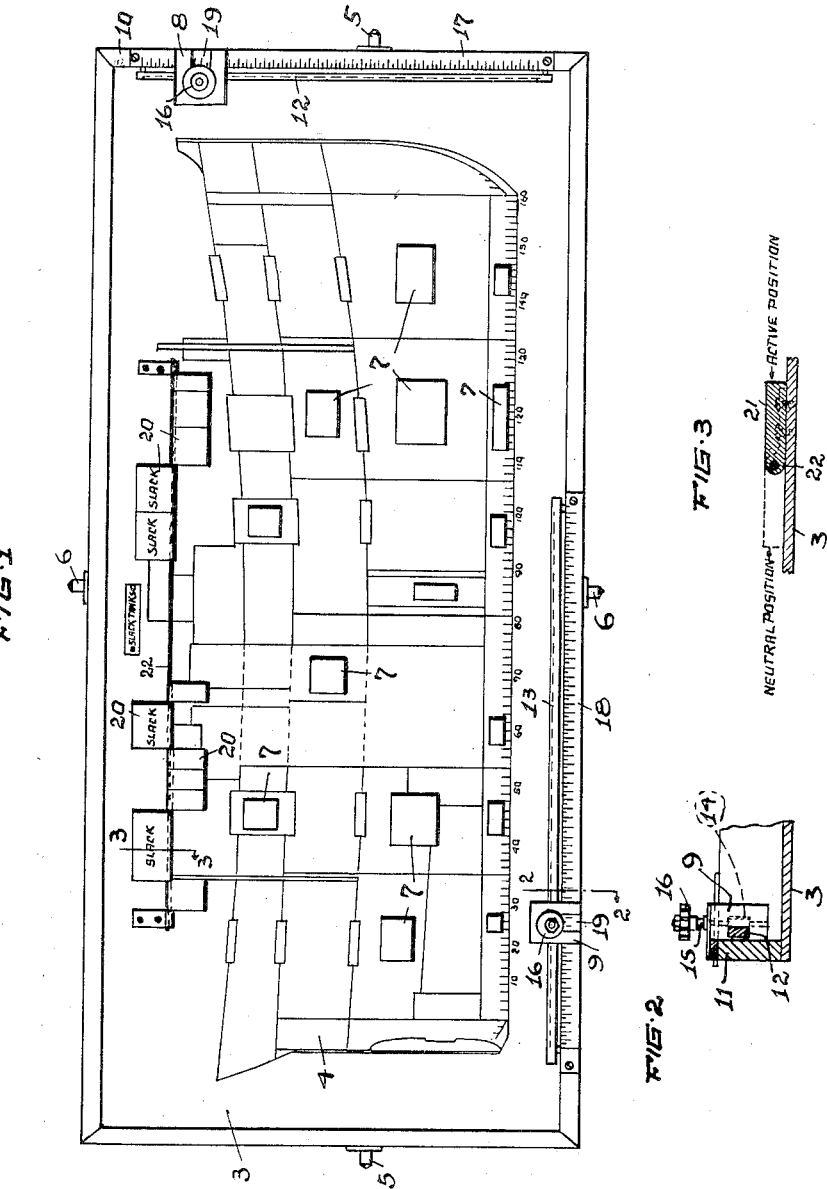
Inventor
Shirley B. Ralston
By Percy H....
Attorney

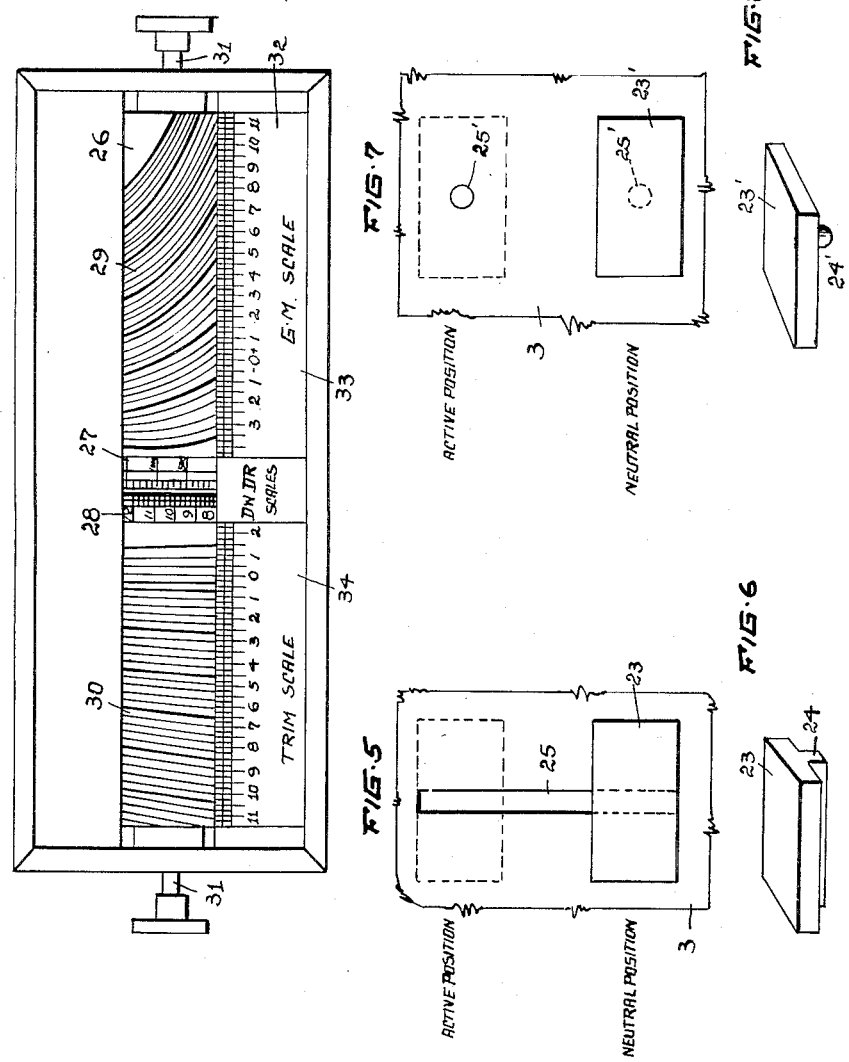

Patented Dec. 10, 1935

2,023,548

UNITED STATES PATENT OFFICE 2,023,548

APPARATUS FOR GRAPHICALLY ASCERTAINING THE STABILITY AND TRIM OF SHIPS UNDER ASSUMED LOADS

Shirley Brooks Ralston, Bearsden, Glasgow, Scotland

Application September 22, 1934, Serial No. 745,150
In Great Britain September 22, 1933

3 Claims. (Cl. 73—151)

My invention relates to certain improvements in apparatus for graphically ascertaining the stability and trim of ships under assumed loads and more particularly to improvements in apparatus of the kind described in the United States Patent No. 1,426,103 of August 15, 1922.

In apparatus of the type referred to generally known as Ralston stability indicators, a table bearing a longitudinal profile diagram of the ship in respect of which the calculations are to be made is supported alternately on longitudinal and transverse horizontal pivots for stability and trim indication respectively. This table is weighted with loose weights placeable in the assumed positions of the cargo or the like in the capacity profile diagram. The weights, representing according to an understood scale, cargo and other load with which the ship is assumed to be loaded, bring the table out of balance and are counterbalanced by a pair of sliding counterpoise weights, adapted to be adjusted in position respectively along the transverse and longitudinal edge or rim of the table, until the table again balances on its longitudinal and transverse horizontal pivots. The final settings of the counterpoise weights can be read on scales arranged sidewise of the counterpoise weights, and the readings of those settings are employed for stability and trim indications on a rotatable drum having marked thereon dead weight and draft scales and G. M. and trim curves. This drum is rotatably adjustably mounted with respect to a rigid scale bar marked with G. M. and trim scales for finally indicating the stability and trim of the ship.

The described apparatus though highly satisfactory fails to take into account the loss of stability of a ship caused by a slack condition of the oil or water tanks, which condition possibly may be sufficient to reduce the supposed G. M. of a ship to zero, as will best be understood from the following: The position of the meta center of a vessel above the center of buoyancy is a function of the moment of inertia of the water plane and the B. M. (the height of the metacenter above the center of buoyancy) is equal to this inertia divided by the volume of displacement of the vessel. However in the case of a slack tank, there is a free surface of liquid on the vessel and therefore the moment of inertia of this free surface must be deducted from the inertia of the water plane, when the B. M. is to be properly calculated. Consequently even a partially filled tank, though not greatly changing the position of the center of gravity of a vessel, may notwithstanding this fact cause a considerable lowering of the position of the metacenter and therewith a corresponding decrease of the G. M.

It is the general object of this invention to provide an apparatus of the type referred to above with means adapted to indicate the action of slack tanks upon the position of the metacenter of a vessel. These means are adapted to change the balance of the table about the longitudinal pivots and may be used for the indication of changes in the position of the metacenter due to slack conditions in any or all of the water and oil tanks of the ship. Preferably the means employed can be brought at will into operative or inoperative position for indicating the position of the metacenter where the tanks are slack or completely filled or emptied.

The above and other objects that I consider characteristic of my invention are set forth with particularity in the appended claims. The invention itself, however both as to its organization and its method of operation, together with additional objects and advantages thereof, will best be understood from the following description of a specific embodiment, when read in connection with the accompanying drawings, in which:

Figure 1 is a plan view of an apparatus for ascertaining the stability and trim of ships under assumed loads embodying shiftable means for measuring the stability with slack or completely fitted or empty tanks;

Figure 2 is a section on the line 2—2 of Figure 1;

Figure 3 is a section on the line 3—3 of Figure 1;

Figure 4 is a plan view of the rotating drum and the rigid scale bar associated therewith, all mounted in a casing;

Figure 5 is a plan view of a modified form of the weighted means used for determining the change of position of the metacenter of a vessel due to slack tanks; and Figure 6 is a perspective view of the weight shown in Figure 5;

Figure 7 is a plan view of still another form of said weighted means; and

Figure 8 is a perspective view of the weighted means shown in Figure 6.

In the preferred embodiment of my invention Figures 1 and 2 comprise a table 3, which has marked upon it the longitudinal profile diagram 4, of the ship, in respect of which the calculations are to be made. This table is provided with knife edged trunnions 5, 5 and 6, 6 by means of which the table 3 can be mounted upon suitable supports (not shown) so as to turn on transverse and longitudinal axes respectively. A plurality of loose weights 7 representing cargo or other load, are placed in the assumed positions of the capacity profile diagram 4 and these weights are counterbalanced by two slidable weights 8 and 9, which are designed to be transversed along the transverse and longitudinal upstanding rims or edges 10 and 11 of the table 3 respectively. The sliding movement of these weights is effected by means of rack bars 12, 13 which are provided on the inside faces of the said rims and by small pinions 14 engaging said rack bars and carried by upright pins 15, which pins are rotatably mounted in the weights 8 and 9. Knobs 16 at the exposed ends of said pins permit of manual rotation of the pinions and therewith shifting of the weights to the desired position. The weight 8 is associated with a transverse or G. M. scale 17, which is fitted to the side of the table over which the weight 8 moves, and the weight 9 is associated with a longitudinal or trim scale 18, provided on the longitudinal edge of the table over which the weight 9 traverses. Windows 19 in the weights 8 and 9 facilitate the reading of scales 17 and 18.

The upper area of the table 3 carries the means which are used for indicating the change in the B. M. (height of the metacenter above the center of buoyancy). These means, which of course may have any desired form, consist of weights 20 pivotally mounted upon said table. There is a weight for each tank or tank section and each weight is independently adjustable to two positions, one corresponding to the condition present when the tank is completely filled or entirely empty and the other one corresponding to the slack condition of the respective tank, the first being the neutral and the latter the active position of the respective weight. The form of the weights shown in Figure 3 is that of weighted flaps 21 hinged to the face of the table upon a pivot rod 22, the axis of which is parallel to the longitudinal pivots of the table. Movement of these weights about their pivots causes them to change from a neutral to an operative position or vice versa.

It is obvious that the shape and form of the weights 20 and their connection to the table can readily be changed as clearly brought out in Figures 5 through 8. The form shown in Figures 5 and 6 consists of a weight 23 slidably connected with the table 3 by means of a rib portion 24, at the bottom face of the weight, which rib portion slides in a groove 25 in the table 3. This groove is dimensioned to stop shifting of said weight in one direction when the weight is in its active position.

The weight 23' in Figures 7 and 8, is provided with a short finger portion or stud 24' adapted to be inserted in openings 25' for the neutral and active position of said weight.

Figure 4 shows the drum 26 having marked thereon the dead weight and draft scales 27 and 28 and also G. M. curves 29 and trim curves 30. This drum is rotatably mounted in bearings (not shown) by means of trunnions 31, to permit of its rotatable adjustment with respect to a fixed scale bar 32, which extends longitudinally adjacent said drum and which is marked with a G. M. scale 33 and a trim scale 34.

When the stability of the ship for which the apparatus is designed is to be ascertained, the loose weights 7 are placed upon the profile diagram 4 on the table 3 in the proper positions to represent the assumed load or deadweight, and then the table is supported upon the pivots 5, 5 and the G. M. weight 8 is adjusted in position until the table balances in a horizontal plane. The figure on the scale 17 indicating the position of the G. M. weight is then noted and the drum 26 rotated until the lower scale coincides with the indication on the scale or register 17, the calibrations on the fixed scale and G. M. scales being identical. The point at which the G. M. scale of the scale 32 is intersected by the G. M. curve bearing the figure obtained by the G. M. weight on the table 3, gives the G. M. required. A similar manipulation of the longitudinal weight 9 and pivots 6, 6 enables the trim to be ascertained.

The stability indication thus made does not disclose any loss of stability possibly entailed by slack tanks, therefore another stability indication must be made in which the largest number of possible slack tanks must be included. This is effected by changing a number of the compensating weights 20 from neutral or inoperative position to active position, and then the previously described steps for measuring the G. M. required is repeated.

The number of compensating weights required for the compensated stability indication depends of course upon the number of tanks from which fuel or water must be taken simultaneously for proper operation of the engines etc. and might include all the weights.

Although I have shown and described certain specific embodiments of my invention, I am fully aware that modifications thereof are possible. Thus for example the compensation for slack tanks might be obtained by a lateral shifting of the pivot pins which support the table for stability indications. My invention, therefore, is not to be restricted except insofar as is necessitated by the prior art and by the spirit of the appended claims.

Having thus described my invention:
What I claim is:

1. An apparatus for graphically ascertaining the stability and trim of ships with water and oil tanks under assumed loads, comprising a diagram table pivoted about longitudinal and transverse axes, a pair of weights slidably mounted on the longitudinal and transverse edges of said table, and shiftable means on said table for ascertaining the stability of ships when the tanks are slack, said means consisting of weights adapted to be shifted toward and away from the longitudinal axis of said table, and means for holding said weights in predetermined positions with respect to the said longitudinal axis.

2. An apparatus for graphically ascertaining the stability and trim of ships with filled and/or slack tanks, comprising a diagram table pivoted about longitudinal and transverse axes, a pair of weights slidably mounted upon the longitudinal and transverse edges of said table, and weighted means tiltably secured to said table, in spaced relation with respect to the horizontal axis thereof, adapted to be placed in predetermined positions with respect to said axis.

3. An apparatus for graphically ascertaining the stability and trim of ships with filled and/or slack tanks, comprising a diagram table pivoted about longitudinal and transverse axes, a pair of weights slidably mounted upon the longitudinal and transversal edges of said table, and weighted means tiltably secured to said table in spaced relation with respect to the longitudinal axis thereof, said tiltable means consisting of weighted flaps hinged to a pivot shaft secured at its opposite ends to said table in parallel relationship with respect to the longitudinal axis thereof.

SHIRLEY BROOKS RALSTON.